United States Patent [19]

Mager et al.

[11] Patent Number: 4,999,034
[45] Date of Patent: Mar. 12, 1991

[54] DESICCANT CARTRIDGE

[75] Inventors: Peter Mager; Willi Schenkel, both of Cologne, Fed. Rep. of Germany

[73] Assignee: Süd-Chemie Aktiengesellschaft, Munich, Fed. Rep. of Germany

[21] Appl. No.: 472,711

[22] Filed: Jan. 31, 1990

[51] Int. Cl.$^5$ ............................................. B01D 19/00
[52] U.S. Cl. ........................................ 55/275; 55/387; 55/389
[58] Field of Search .......................... 55/275, 387, 389; 220/87.1

[56] References Cited

U.S. PATENT DOCUMENTS 3,246,758  4/1966  Wagner ................................. 55/275
4,146,277  3/1979  Santoro ................................. 55/387

FOREIGN PATENT DOCUMENTS 236677  6/1986  German Democratic Rep. ... 55/387

Primary Examiner—Bernard Nozick
Attorney, Agent, or Firm—Herbert P. Price

[57] ABSTRACT

A desiccant cartridge for a container, which contains moisture-sensitive product, wherein said desiccant cartridge contains at least one outside-connection opening via which the desiccant cartridge is joined to the surrounding air, a desiccant being contained in a cartridge casing. A surrounding-air duct extends between the outside-connection opening and the desiccant. This surrounding-air duct forms a long diffusion path in relation to the breathing cross-sectional area of the desiccant cartridge.

16 Claims, 2 Drawing Sheets

DESICCANT CARTRIDGE

BACKGROUND OF THE INVENTION

The field of art to which this invention pertains is desiccant devices.

Desiccant cartridges are used on containers, casings, reactors and the like which contain moisture sensitive products.

Desiccants cartridges can usually be exchanged from the outside of the container which is filled with the product to be protected from moisture. The cartridges are generally connected to the container by means of a sleeve or flange joint. The object of the desiccant in the desiccant cartridge is to protect the contents of the container from enclosed and penetrating atmospheric moisture.

Desiccant cartridges which are connected to containers, casings, reactors, and the like which contain moisture-sensitive products are generally divided into closed, open, or combined systems. The closed systems are not joined to the air which surrounds the container, whereas the open systems are joined to the ambient atmosphere. The combined systems are joined to the ambient atmosphere through pressure compensation valves which open when there is an under-or-over pressure in the container.

With the closed systems, there is often the problem that pressure compensation between the interior of the container and the surroundings is impossible, so that in some cases desiccant cartridges are provided with pressure compensation valves. The desiccant cartridges with the pressure compensation valves should be classed with the combined systems. The pressure compensation valves respond only when there is a desired under- or over-pressure in the interior of the container, joining to the surrounding air then being effected. In this case, however, air flows comparatively quickly-corresponding to the decrease in pressure—through the desiccant into the container or to the outside.

Open systems must be used for containers with moisture-sensitive products which are not designed for large pressure differences. However, these generally have the disadvantage that the desiccant is consumed comparatively quickly since an exchange of air with the surrounding air also takes place at all times.

These systems may nevertheless be necessary in various cases, namely, for example, when there is the additional object of neutralizing hydrogen sulfide or other acid/air mixtures and preventing their unfiltered admission into the atmosphere, by selecting a specific desiccant, such as aluminum gel or a molecular sieve.

It is precisely in cases of this type, however, that sufficient safety reserves of desiccant must at all times be kept ready in the cartridge so that, when there is an ejection of hydrogen sulfide as a result of inadequate adsorption capacity, no corresponding contamination of the environment results.

SUMMARY OF THE INVENTION

The present invention is based on the object of providing a desiccant cartridge which is mainly suited for open systems but is nevertheless designed for cost-favorable long-term operation so that no appreciable loading of the desiccant takes place, even when the container is standing for a relatively long period of time.

The desiccant cartridge of this invention is used with a container, casing, reactor and the like which contain moisture-sensitive products wherein said container has at least one outside-connection opening through which the desiccant cartridge is joined to the surrounding air and with desiccant which is contained in a cartridge casing. Between the outside-connection and the desiccant, a surrounding-air duct forms a diffusion path whose length is at least eight times greater than the square root of the breathing cross-sectional area of the desiccant cartridge.

As a result of the especially long surrounding air-duct, provided according to this invention as a diffusion path, stabilization of the air joined freely to the surrounding air is achieved before its contact with the desiccant. There is also created in the region of the outer air duct a standing column of air which has already been pre-dehumidified to an extent and, as a result of the poor circulation of air here, does not give rise to any large losses of desiccant.

DESCRIPTION OF THE INVENTION

Figure 1:
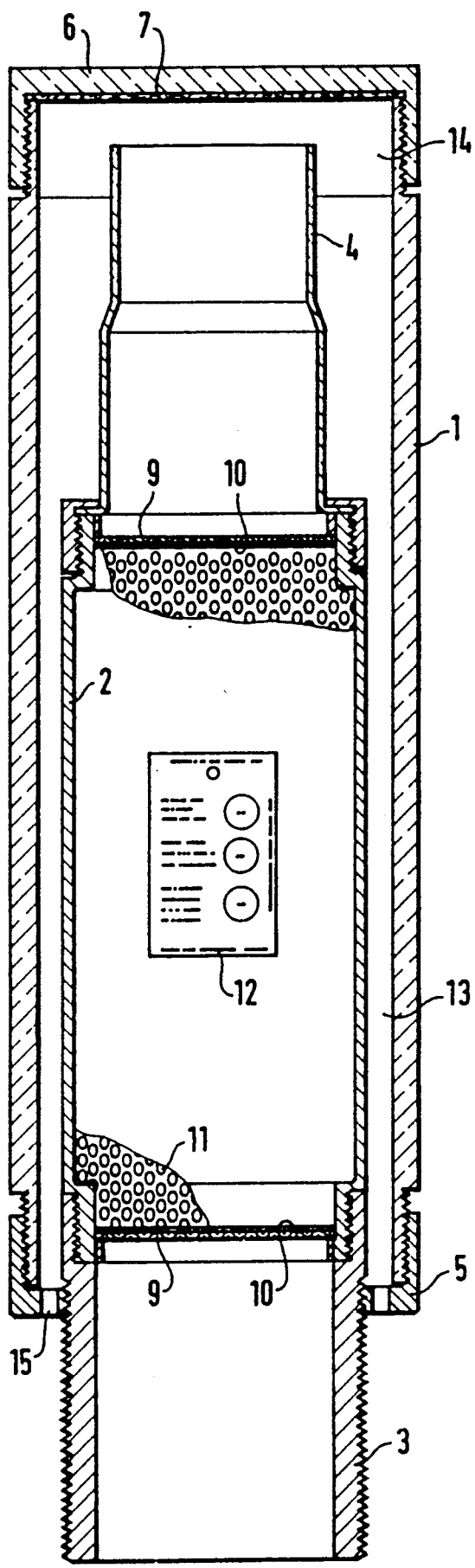
FIG. 1 of the drawings shows a longitudinal cross-sectional view of the desiccant cartridge of this invention.

The desiccant cartridge of this invention contains between the outside connection and the desiccant a surrounding-air duct which forms a diffusion path whose length is at least eight times, preferably ten times, greater than the breathing cross-sectional area of the desiccant cartridge.

As a result of the especially long diffusion path, which for reasons of space or as a condition of the construction may also be deflected, the movement of air and convection caused by desiccation air is prevented when possible. The desiccation capacity is maintained for an optimum length of time as a result of this measure. It is, furthermore, especially favorable in this connection that an actual exchange of air takes place only where there is a pressure difference which generates a continuous flow of air, as occurs when the container is being emptied or filled or with large differences in temperature, whereas with small fluctuations in pressure, the air situated in the surrounding-air duct acts as a buffer and losses of desiccant capacity are prevented.

The desiccant cartridge according to the invention can nevertheless be designed such that large pressure gradients are not generated even when the container is loaded or unloaded quickly. In addition, the flow resistance is correspondingly measured in both the region of the desiccant cartridge and the region of outside-connection openings. The cross-sectional area of the outside connection openings is selected such that as little moisture as possible enters through rain, etc. and that any gusts of wind do not cause the air in the surrounding-air duct to swirl. The cross-sectional area of the outside-connection openings must, however, ensure that the flow resistance remains within acceptable limits, where it must also be taken into consideration that the time required for the air to drift through the desiccant cartridge should be adapted to the desiccation capacity of the latter.

A vertical arrangement of the desiccation cartridge with the surrounding-air duct extending between an outer casing and the cartridge casing is especially favorable since the exchange of air between the upper and lower layers in the surrounding-air duct is then at its lowest.

The air can advantageously be deflected once by 180° in the manner of a labyrinth before it can get anywhere near the region of the desiccant, a further stabilization of the air taking place in the region of the ventilation tube adjacent to the deflection.

The outer casing can be produced as transparent or be provided with a viewing window. A change in color of a moisture indicator card inserted in the region of the desiccant is thus visible from outside without the need to carry out disassembly. With certain desiccants, such as blue gel, loading or saturation is visible by a discoloration.

Apart from aluminum gel and molecular sieves, any of the well known desiccants, such as a granulate of silica gel, blue gel, calcium sulfate, calcium chloride and the like, also can be used as desiccants.

In spite of the comparatively large length of the surrounding-air duct, the flow resistance is selected such that a sudden change in pressure in the container, as is triggered, for example, by filling or emptying, can rapidly be compensated. It is especially favorable if the flow resistance and the dimensions of the cartridge casing are selected such that they correspond to the strength values of the container to be ventilated, it being necessary for a certain safety reserve to be included.

The desiccant cartridge can be constructed so that the cartridge casing is surrounded by an outer casing and the surrounding-air duct extends partially between the outer casing and the cartridge casing. The surrounding-air duct can have at least one deflection up to 180° in the opposite direction. The surrounding-air duct can have a ventilation tube which extends above the desiccant and whose diameter is at least eight, preferably eight to eleven times, less than the length of the diffusion path.

In a modification of the desiccant cartridge, the cross-sectional area of the surrounding-air duct increases from the outside-connection opening toward the desiccant, particularly in a stepwise manner.

The outer casing and the cartridge casing are preferably arranged coaxially and extend vertically.

The desiccant cartridge can have more than one outside-connection opening wherein the total cross-sectional area corresponds to or is less than the area of the ventilation tube or the breathing cross-sectional area. The outside-connection openings are preferably annular in shape and are distributed about the outer casing, are arranged adjacent to the container-side end of the desiccant cartridge and extend radially or axially relative to the desiccant cartridge casing.

The effective cross-section of the outside connection openings is designed to correspond to the maximum flow rate which occurs during the filling or emptying of the container or, when the container is not being filled, is designed to correspond to the flow rate caused by heating up or cooling down of the gas in the container.

The desiccant cartridge casing along with the desiccant can have a conventional cartridge shape, i.e., a cylindrical basic form with a refillable cartridge or a disposable cartridge with a sealed cartridge casing.

The desiccant cartridge in one aspect can have a diameter which is large in relation to its length.

The outer casing of the desiccant cartridge can have a protective tube sealed with a cover. The protective tube can be made from transparent material or can have a viewing window for checking the loading or saturation of the desiccant. The saturation can be detected by the coloration of a moisture indicator card or by an indicator in the desiccant.

Further features, details and advantages are found in two exemplary embodiments of the invention with reference to the drawings.

The desiccant cartridge according to the invention shown in FIG. 1 exhibits an outer casing 1 which is at the same time designed as a protective tube. The outer casing 1 completely surrounds a cartridge casing 2. Coaxial to the cartridge casing 2 and adjoining the latter from below, a connecting element 3 is provided which can be produced as a pipe socket, a sleeve or a flange and, in the case of the example, is designed as a pipe socket with an external screwthread. The connecting element 3 serves to join the desiccant cartridge according to the invention to a correspondingly designed part of a wall etc. (not shown) of a container, a casing etc. in which the moisture-sensitive product is contained. In the exemplary embodiment shown, the connecting element 3 in the form of a pipe socket with an external screwthread is screwed into the corresponding internal screwthread of the sleeve welded into the container wall, additional sealing means being provided for the seal between the sleeve and the pipe socket.

In the exemplary embodiment shown, a ventilation tube 4 is designed adjoining the cartridge casing from above. The length of the diffusion path is in this case advantageously eight to ten times greater than the diameter of the ventilation tube. The ventilation tube 4 is open at the top.

Figure 2:
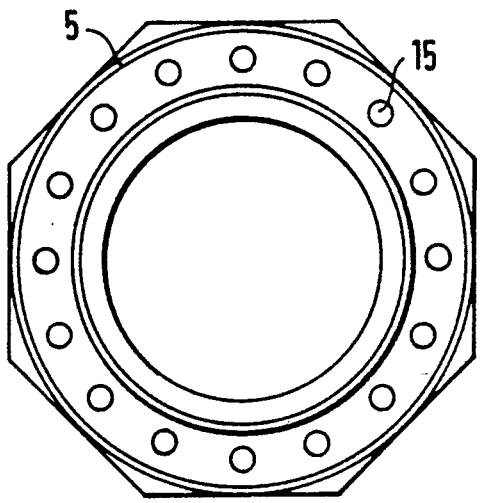
FIG. 2 shows a view of the desiccant cartridge from below.

The cartridge casing 2 is connected to the connecting element 3 by an external screwthread. A ventilation cap 5 is screwed onto the connecting element 3 by its internal screwthread and, with its internal screwthread, produces a solid joint to the outer casing 1, as shown in FIG. 2.

As its other end, the outer casing 1 exhibits another external screwthread onto which a cover 6 is screwed. A sealing device 7, which prevents the inadvertent admission of air or rain at this point, is provided between the outer casing 1 and the cover 6.

The cartridge casing 2 is closed, at each of its two ends by mesh inset 9, on each of which rests a web disk 10. A desiccant 11, which in the case of the example is designed as a 0.4 nm molecular sieve, is located in the space between the web disks 10. On the outer side of the cartridge casing 2 a moisture indicator card 12 is attached which at the same time serves as a load indicator for the desiccant 11. When the outer casing 1 is formed from transparent material or at least has a corresponding window, it is possible to see the moisture indicator card 12 without the desiccant cartridge having to be disassembled.

A surrounding-air duct 13 is provided according to the invention which extends in the region between the cartridge casing 2 and the outer casing 1, undergoes a deflection by approximately 180° in an upper region 14 and then runs further through the ventilation tube 4 to the upper mesh inset 9.

The surrounding-air duct 13 is joined to the surrounding air via outside-connection openings 15 which, in the case of the example, extend in the ventilation cap 5 directly next to the connecting element 3. Care should be taken here that the outside-connection openings 15 do not become covered up by screwing the connecting element 3 too deeply into the sleeve of the container (not shown).

On the other hand, the arrangement of the outside-connection openings 15 shown in FIG. 1, which are arranged annually at the bottom and facing the container wall in the ventilation cap 5, offers the greatest safety from contamination.

As can be seen in FIG. 1, the dimensions of the surrounding-air duct 13 are selected such that the length of the surrounding-air duct 13 is comparatively large in relation to both the internal diameter of the ventilation tube 4 and in relation to the cross-sectional area of the outside-connection openings 15. In the case of the example, the diffusion path from the outside-connection openings 15 to the upper mesh inset 9 is 301 mm long, while the internal diameter of the ventilation tube 4 is 36 mm. The ratio V resulting therefrom is 1:8.36.

As can be seen from FIG. 2, 16 bores with, in each case, diameters of 4 mm, are provided as outside-connection openings 15 in the exemplary embodiment shown so that the effective cross-sectional area F is 50.24 mm$^2$.

It is favorable for the cross-sectional area of the surrounding-air duct 13 to increase moving away from each of the outside-connection openings 15. This can be achieved in the exemplary embodiments according to the invention in accordance with FIG. 1 by keeping the annular gap between the cartridge casing 2 and the outer casing 1 relatively narrow, a somewhat wider region between the ventilation tube 4 and the outer casing 1 closing this region. In addition, the ventilation tube 4 may be tapered in the manner shown in FIG. 1 so that an even higher degree of homogenization takes place here. This design is especially favorable since an optimally high degree of flow stabilization and flow homogenization to the mesh inset 9 and hence to the desiccant 11, takes place as a result.

As shown in FIG. 2, the ventilation cap 5 may advantageously be provided with an outer octagonal shape or outer hexagonal shape to enable the outer casing 1 to be screwed on and unscrewed, and hence the desiccant 11 to be changed with ease.

Figure 3:
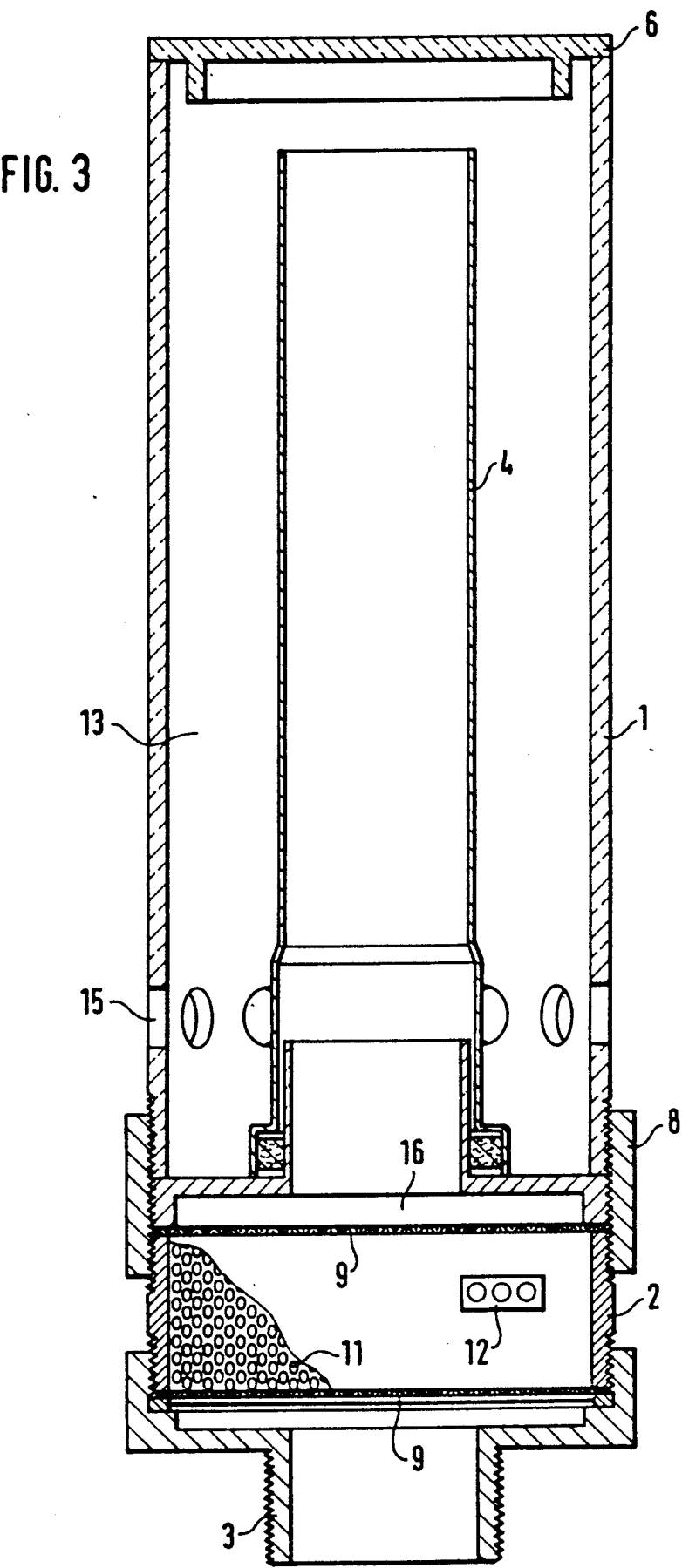
FIG. 3 shows a longitudinal cross-sectional view of a further embodiment of the desiccant cartridge.

In the illustration according to FIG. 3, identical or similar parts correspond to identical or similar parts of the embodiment according to FIG. 1 and 2 and are designated with corresponding reference numerals so that an additional description is unnecessary. An adaptor 8 is visible in FIG. 3, via which the cartridge casing 2 is a screwed together with the outer casing 1. As can be seen in FIG. 3, the adaptor 8 carries in addition a socket base for the ventilation tube 4 which can thus be attached simply during assembly.

As distinct from the exemplary embodiment according to FIGS. 1 and 2, the outside-connection openings 15 extend radially and the ventilation tube 4 is longer than the exemplary embodiment previously described so that the receptacle for the desiccant 11 is relocated in a region below the height of the outside-connection openings 15. The desiccant is correspondingly provided between two mesh insets 9 whose diameter corresponds approximately to the diameter of the outer casing 1, a fairly wide flow homogenization area 16, to which the ventilation tube 4 is adjacent, being provided above the upper mesh inset 9. As a result of this design, the ventilation tube 4 correspondingly extends over almost the entire height of the desiccant cartridge according to the invention.

As a further deviation from the exemplary embodiment illustrated previously, the cover 6 is designed as a viewing window lid which makes it possible to look through the ventilation tube 4.

In the exemplary embodiment illustrated according to FIG. 3, twelve bores are distributed around the circumference as outside-connection openings 15. The diameter of the outside-connection opening 15 in the exemplary embodiment shown in FIG. 3 is 15 mm, which gives a total area of approximately 2120 mm$^2$. The internal diameter of the ventilation tube 4 in this exemplary embodiment is 47 mm, while the length of the diffusion path from the outside-connection opening 15 to the upper mesh inset 9 is 515 mm. This gives the ratio V of 1:10.96.

The results of comparative experiments are given below, in which the following experimental parameters existed:
Desiccant 250 g
Molecular sieve 0.4 nm
Test atmosphere 20°±2° C.
100% relative humidity
Test duration 66 hours.

The increase in weight of the filling material, corresponding to the adsorbed water vapor, was measured.

|  | Conventionl desiccant cartridge | Dessicant cartridge according to the invention |
|---|---|---|
| Increase in water vapor | 3.8 g | 0.9 g |

This consequently gives a shelf life of the products used increased by 422 percent with otherwise identical characteristics, and the same applies to the other desiccants used, not even taking into account the fact that the reduction in the adsorption capacity, as well as the adsorption of water vapor, does not take place linearly, but with a negative logarithm.

It is also especially favorable for the desiccant, which can at the same time be used as a filtering material for hydrogen sulfide or other acid/air mixtures, to be arranged close to the container and far from the surrounding air so that the emission of such substances into the atmosphere is reliable prevented as a result of the long diffusion path through the surrounding-air duct 13.

What is claimed is:

1. A desiccant cartridge for connection to a container which contains moisture-sensitive products wherein said desiccant cartridge is comprised of a cartridge casing having a dessicant, means for retaining the desiccant and having at least two openings for the passage of air, one opening (a) being connected to the container, the other opening (b) being connected to the cartridge casing and communicating with the outside air by means of an outer casing which forms an air duct which completely surrounds the cartridge casing wherein said air-duct forms a diffusion path the length of which is at least eight-times greater than the square root of the breathing cross-sectional area of the desiccant cartridge.

2. The desiccant cartridge of claim 1 wherein the length of the diffusion path is at least 10 times greater than the square root of the breathing cross-sectional area of the desiccant cartridge.

3. The desiccant cartridge of claim 1 wherein the surrounding-air duct has at least one deflection up to 180° in the opposite direction.

4. The desiccant cartridge of claim 1 wherein the effective cross-section of the outside-connection openings is designed to correspond to the maximum flow rate which occurs during the filling or emptying of the container or, when the container is not being filled, is designed to correspond to the flow rate caused by heating up or cooling down the gas situated in the container.

5. The desiccant cartridge of claim 1 wherein the cartridge casing, along with the desiccant situated therein, is formed as a conventional cartridge with a cylindrical basic form, either as a refillable cartridge or as a disposable cartridge with a sealed cartridge casing.

6. The desiccant cartridge of claim 1 wherein the cartridge casing has a diameter which is great in relation to its length.

7. The desiccant cartridge of claim 1 wherein the surrounding-air duct has a ventilation tube which extends above the desiccant and whose diameter is at least eight times less than the length of the diffusion path.

8. The desiccant cartridge of claim 7 wherein the diameter is eight to eleven times less than the length of the diffusion path.

9. The desiccant cartridge of claim 1 wherein the surrounding-air duct has a cross-section which increase from the outside-connection opening towards the desiccant.

10. The desiccant cartridge of claim 9 wherein the increase is in a stepwise manner.

11. The desiccant cartridge of claim 1, wherein the cartridge opening is surrounded by the outer casing and the surrounding-air duct extends partially between the outer casing and the cartridge casing.

12. The desiccant cartridge of claim 11 wherein the outer casing and the cartridge casing are arranged essentially coaxially and extend vertically.

13. The desiccant cartridge of claim 11 wherein several outside-connection openings are provided whose total cross-sectional area corresponds to or is less than the area of the ventilation tube or the breathing cross-sectional area.

14. The desiccant cartridge of claim 13 wherein the outside-connection openings are annular in shape and distributed about the outer casing, are arranged adjacent to the container-side end of the desiccant cartridge and extend either radially or axially, in each case relative to the cartridge casing.

15. The desiccant cartridge as claimed in claim 11 wherein the outer casing has a protective tube sealed with a cover.

16. The desiccant cartridge as claimed in claim 15 wherein the protective tube is produced from transparent material or has a viewing window for checking the loading or saturation of the desiccant by the coloration of the impregnated fields of a moisture indicator card or of a desiccant with an indicator.

* * * * *